United States Patent [19]

Fujinami et al.

[11] Patent Number: 4,909,359

[45] Date of Patent: Mar. 20, 1990

[54] BRAKE DEVICE

[75] Inventors: Hideyuki Fujinami; Takashi Inoue, both of Saitama, Japan

[73] Assignee: Akebono Brake Industry Co., Ltd., Tokyo, Japan

[21] Appl. No.: 331,073

[22] Filed: Mar. 27, 1989

Related U.S. Application Data

[63] Continuation of Ser. No. 81,145, Aug. 3, 1987, abandoned.

[30] Foreign Application Priority Data

Aug. 5, 1986 [JP] Japan ................................ 61-182661
Aug. 5, 1986 [JP] Japan ................................ 61-182662

[51] Int. Cl.[4] ...................... F16D 55/36; F16D 55/14; F16D 55/08
[52] U.S. Cl. .................................. 188/71.5; 188/72.2; 188/72.7
[58] Field of Search .................... 188/72.2, 72.6, 72.7, 188/72.9, 71.3, 71.4, 71.5; 192/54

[56] References Cited

U.S. PATENT DOCUMENTS

| | | | |
|---|---|---|---|
| 2,375,855 | 5/1945 | Lambert | 188/72.6 X |
| 2,423,011 | 6/1947 | Du Bois | 188/72.2 X |
| 3,191,732 | 6/1965 | McDowall | 192/54 X |
| 3,239,042 | 3/1966 | Jandasek | 192/54 X |
| 3,332,521 | 7/1967 | Burnett | 188/72.6 X |
| 3,583,529 | 6/1971 | Robinson | 188/71.4 |
| 3,743,060 | 7/1973 | Hendrickson | . |
| 4,327,821 | 5/1982 | Telford | 192/54 X |
| 4,550,810 | 11/1985 | Price et al. | 188/72.6 X |
| 4,645,049 | 2/1987 | Matsuda et al. | 192/54 X |

FOREIGN PATENT DOCUMENTS

| | | | |
|---|---|---|---|
| 1505475 | 7/1969 | Fed. Rep. of Germany | 188/72.7 |
| 0024841 | 2/1986 | Japan | 188/72.7 |
| 1457512 | 12/1976 | United Kingdom | 188/72.7 |
| 2034834 | 6/1980 | United Kingdom | . |
| 2075623 | 11/1981 | United Kingdom | . |

Primary Examiner—Robert J. Oberleitner
Attorney, Agent, or Firm—Cushman, Darby & Cushman

[57] ABSTRACT

A brake device for braking a shaft including a number of rotors rotatable with the shaft and at least one stator interposed among the rotors. The frictional force generated between the rotors and the stator is fed back to a rotatable pressure plate to assist in braking the shaft. In a first embodiment, a projection of the pressure plate engages one of a number of toothed portions that are provided on one of the stator elements to transmit force from the stator elements back to the pressure plate. In a second embodiment, a linkage element for turning the pressure plate also engages one of the toothed portions on the stators, thus transmitting force from the stator back to the pressure plate to assist in braking.

5 Claims, 3 Drawing Sheets

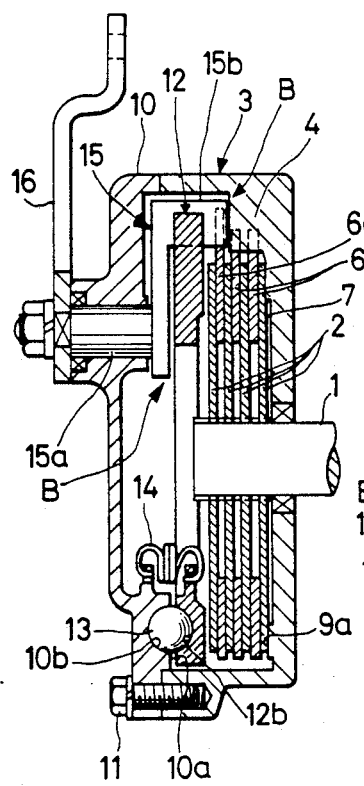
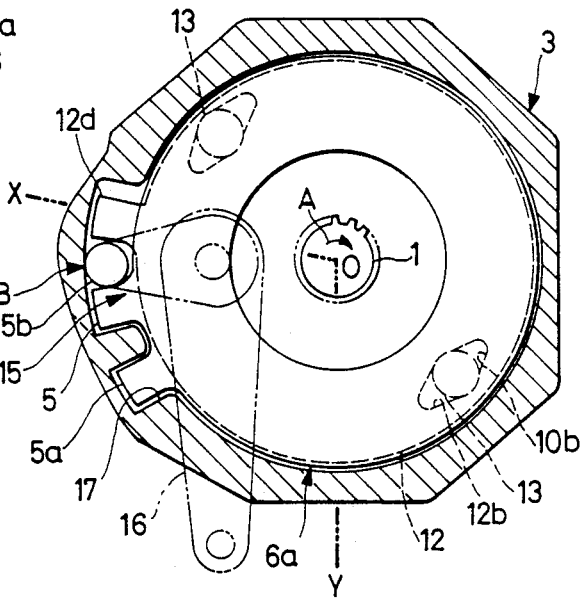
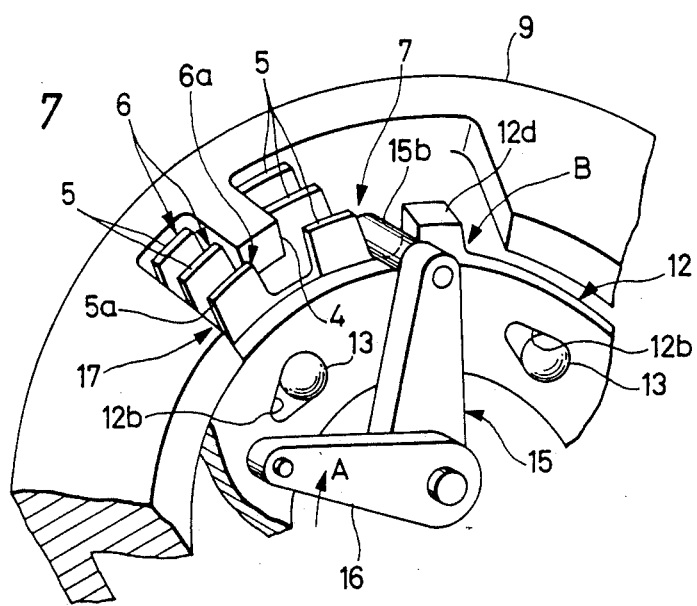
FIG. 5
FIG. 6
FIG. 7

BRAKE DEVICE

This is a continuation of application Ser. No. 81,145, filed Aug. 3, 1987, now abandoned.

BACKGROUND OF THE INVENTION

1. Field of the Invention

The present invention relates to brake devices for an automobile or the like. More particularly, the present invention relates to a wet-type brake device in which a frictional force generated within the brake is fed back to a cam lever to help operate the brake.

2. Description of the Prior Art

Prior art brake devices which utilize the frictional force generated between a plurality of stators and rotors within the brake to assist in turning a cam-mounted pressure plate towards the rotors are known, as is disclosed in unexamined Japanese Utility Model Application Publication No. 55-80542 and Japanese Utility Model Publication No. 60-15004.

In such devices, the servo function obtained by feeding the frictional force generated between the rotors and stators back to the pressure plate was generated only by the rotor which is located at the outermost position adjacent to the pressure plate, making it impossible to adjust the servo force being fed back to the pressure plate.

In addition, the rotors in such prior art devices exerted an impacting sliding force onto the pressure plate at the moment the brake was operated. This force was frequently transmitted back through the baking linkage to the vehicle operator, thus reducing the life of the system and causing discomfort to the operator.

Moreover, a further problem that was common to such prior art devices was that the above-described servo mechanism would actually create a negative feedback when the vehicle was in reverse, thereby reducing the braking force that could be applied to the rotors. This resulted because the frictional force generated between the rotors and the stators would actually cause the pressure plate to be forced in a direction opposite to its braking position.

SUMMARY OF THE INVENTION

It is therefore an object of the present invention to solve the above-mentioned problems in conventional servo-type brake devices.

In order to attain the above object, the present invention according to a first embodiment comprises a sliding portion including a plurality of rotors and a plurality of annular stators, the rotors being rotatably fixed and axially slidable with respect to a rotary shaft so as to be rotatable together with the rotary shaft, the stators being disposed between the rotors and provided with a toothed portion, which is arranged to be engaged by a brake housing; a pressure plate disposed between an inner side surface of the brake housing and one of the rotors located nearest to the inner side surface, the pressure plate having recessed portions respectively having slant surfaces opposed to each other; and a ball bearing provided in each of the recessed portions, so that the pressure plate is forced towards the rotors when it is rotated by engagement of the ball bearings with the slant surfaces of the recessed portions.

According to the present invention, at least one of the stators is arranged so as to be rotatable relative to the brake housing and engageable with a brake input side member so as to facilitate the turning of the pressure plate in the direction of rotor rotation.

According to one aspect of the present invention, the rotatable stator that is engageable with the brake input side member is also arranged to be engageable with a stopper provided on the brake housing when the rotors are turned in a reverse direction, thus preventing negative feedback that would lessen the braking force that could be applied to the rotors.

In a brake device according to the present invention, if the brake rod is pulled or pushed, the pressure plate is rotated to move the ball toward the shallow portions of the recessed portions to cause the pressure plate to engage the rotors. At the same time, at least one of the rotatable stators engages the brake input side member, which in turn exerts additional braking force on the pressure plate.

At the same time, if the brake rod is pushed or pulled to actuate the pressure plate while the rotors are rotating in the reverse direction, at least one rotatable stator is stopped from rotating by the stopper member on the brake housing, so that no force is applied to the pressure plate by the stators.

Other objects, features, and characteristics of the present invention, as well as the methods and operation and functions of the related elements of the structure, and to the combination of parts and economies of manufacture, will be apparent upon consideration of the following description and the appended claims with reference to the accompanying drawings, all of which form a part of the specification, wherein like reference numerals designate corresponding parts in the various figures.

BRIEF DESCRIPTION OF THE DRAWINGS

FIG. 5 is a side view partly in section of a second embodiment of the present invention;

FIG. 6 is a front view partly in section of the embodiment of FIG. 5 and;

FIG. 7 is an enlarged perspective view of a main part of the embodiment of FIG. 5.

DETAILED DESCRIPTION OF THE PREFERRED EMBODIMENT

Figures 1, 2:
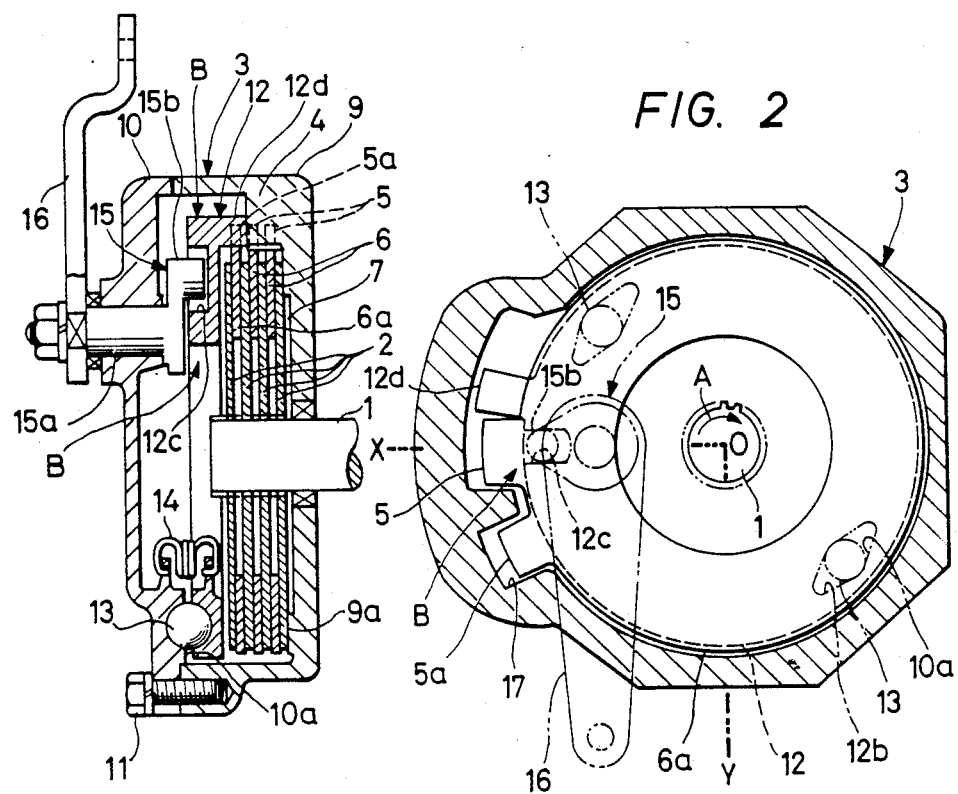
FIG. 1 is a side view partly in section of a first embodiment of the preset invention.
FIG. 2 is a front view partly in section of the embodiment of the present invention illustrated in FIG. 1.

Referring to FIGS. 1-4, a first embodiment of the present invention includes a rotating portion 7, which is constituted by a plurality of rotors 2 and a plurality of annular stators 6a. Rotors 2 are slidably mounted on and rotatably fixed with respect to a rotary shaft 1, so as to rotate therewith. Annular stators 6 are interposed between rotors 2 and are provided with a pair of toothed portions at the outer circumferential portion thereof that is engageable with an anchor portion 4 on the brake housing 3.

Brake housing 3 includes a casing 9 and a lid 10, which are closely joined to each other by means of a bolt 11. An annular pressure plate 12 is provided between an inner side surface 10a of the lid 10 and one of the rotors 2 located nearest the inner side surface 10a, so that pressure plate 12 can rotate concentrically with the rotary shaft 1 along a guide surface (not illustrated), which is provided on the brake housing 3.

Figure 4:
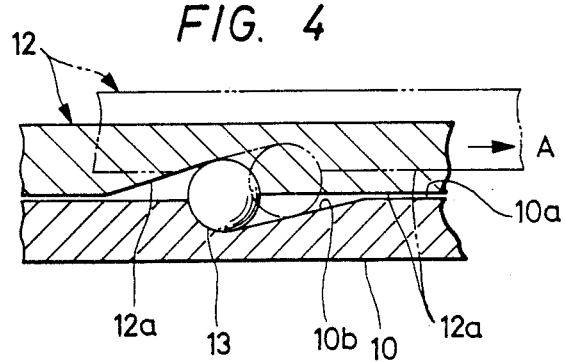
FIG. 4 is a side view partly in section showing a main part of the stator in the embodiment of FIG. 1.

A number of recesses 10b and 12b each having a slant surface are formed in the inner side surface 10a of lid 10 and in a side surface 12a of the pressure plate 12 opposite the inner side surface 10a, respectively, as is shown in FIG. 4. A ball 13 is receivable within a recess portion between the inner side surface 10a of lid 10 and the side surface 12a of pressure plate 12. The pressure plate 12 is normally urged toward the lid 10 by a spring 14, as shown in FIG. 1.

A cam lever 15 is provided having a shaft portion 15a which is rotatably supported by the lid 10 and a pin portion 15b that is engageable with a groove 12c defined in the pressure plate 12. Cam lever 15 thereby forms a brake input side member that is engageable by one or more of the stator members to help rotate the pressure plate 12.

Figure 3:
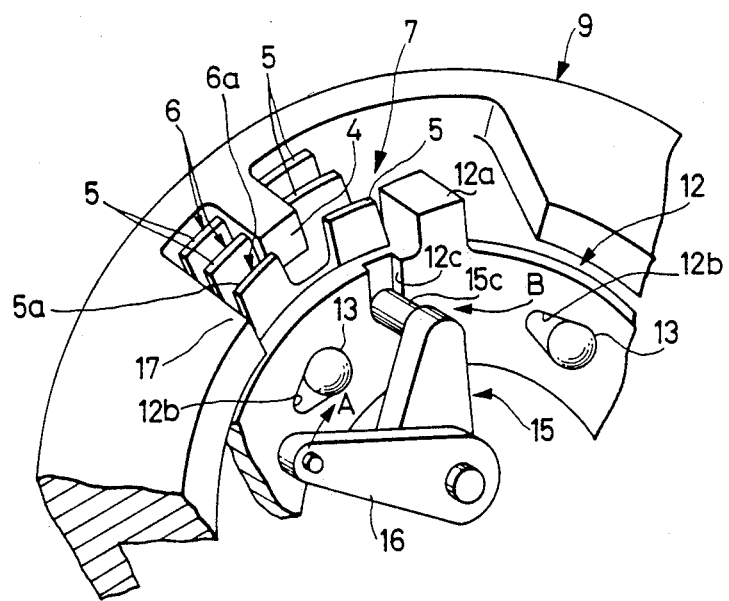
FIG. 3 is an enlarged perspective view of the embodiment of the present invention illustrated in FIG. 1.

In this arrangement, when a brake rod (not shown) connected to an arm 16 is pushed or pulled to rotate arm 16 in the direction of arrow A, as shown in FIG. 3, the pressure plate 12 is rotated in the direction of the arrow A and ball 13 moves toward the shallow portions of the recesses 10b and 12b, thus forcing the pressure plate 12 toward the rotating portion 7. This causes the rotating portion 7 to bear against a pressure receiving surface 9a on the casing 9, whereby a predetermined braking force is exerted onto the rotary shaft 1.

An engaging portion 12d is provided on an outer circumferential portion of the pressure plate 12 so that the toothed portion 5 of at least one of the stators 6a(one stator adjacent to the pressure plate 12 in FIG. 1) engages the engaging portion 12d as the stator is rotated in the direction of arrow A.

Accordingly, if the brake is operated when the rotary shaft 1 is rotated in the direction of arrow A, the pressure plate 12 is rotated in the direction of arrow A when the brake is actuated, causing the rotating portion 7 to bear against the contact portion 9a of the housing 9 to brake the shaft 1.

At the same time, the stator 6a receives a rotary force in the direction of arrow A from the rotors 2 so that additional force is applied from the stator 6a to the pressure plate 12 in order to assist the operational force exerted onto the cam lever 15 to operate the brake. In this way, a sufficiently large braking effect may be obtained by a relatively small input force on the brake lever.

In order to adjust the servo force which is fed back from the rotors to the braking lever, the actual length of engaging portion 12d may be adjusted to change the number of rotatable stators 6a which can be engaged thereby.

In order to prevent a negative servo effect that would reduce the available braking force during reverse rotation of shaft 1, a stopper 17 is provided in the casing 9 at the back of the toothed portion 5a of stator 6a to engage the toothed portion 5a when the stator is caused to be rotated in the direction opposite from that indicated by arrow A. The position of stopper 17 is set so that the toothed portions 5a do not engage stopper 17 when the brake is released, but only upon generation of the negative servo effect when the rotary shaft 1 is rotated in the direction opposite from that indicated by arrow A.

In the embodiment illustrated in FIGS. 1-3, the servo stator 6a is engaged with pressure pate 12 through the toothed portions 5 thereon. In this way, the servo stator 6a may be made identical in shape with the remaining stators 6, thereby allowing the stators to be interchanged and reducing manufacturing costs.

FIGS. 5-7 illustrate a second embodiment of the present invention, whereby a toothed portion 5 of the stator 6a is arranged to engage a pin portion 15b of the cam lever 15 when the stator is caused to rotate in the direction of arrow A, as is shown in FIG. 6. Pin portion 15b of cam lever 15 also contacts the engaging portion 12d of pressure plate 12 to transmit the force applied to pin portion 15b by stator 6a to rotate pressure plate 12 in the direction of arrow A. In this way, the pressure plate 12 does not directly engage any of the stators 6 as it does in the embodiment of FIGS. 1-3.

As in the embodiment of FIGS. 1-3, the servo effect created by applying the frictional force generated between the stator 6a and the rotors 2 to turn the pressure plate 12 may be increased by increasing the length of the pin portions 15b so that an additional number of stators 6a may be engaged by the pin portions.

As illustrated in FIG. 7, reverse rotation of the stators 6a is prevented by a stopper 17 provided on the casing 9. In this way, reverse force will not be applied from the stators to the pin portion 15b of the cam lever 15, which would reduce the braking force that could applied to the pressure plate 12 by cam lever 15. As in the embodiment of FIGS. 1-3, the servo stator 6a may be the same shape as the other stators 6.

However, in the embodiment of FIGS. 5-7, it is not necessary to provide a groove 12c for engaging the pin portion 15b in the pressure plate 12. Moreover, the engaging portion 12d that is provided on the outer circumferential portion of the pressure plate 12 may be formed of the same thickness as the remainder of the plate, thereby lessening manufacturing costs.

Although illustration is omitted, the sliding surfaces of pressure plate 12, the rotors 2 and the stators 6,6a may be provided with replaceable wear surfaces.

It is evident that the servo braking mechanism of the present invention is superior to those prior art devices that apply force directly from the rotors to the pressure plate in order to aid in the braking of a vehicle. In the present invention, the additional braking force that is provided through the stators is applied smoothly and gradually to the pressure plate 12. This stands in sharp contrast to the abrupt and destructive impact between the rotors and the pressure plate that occurred in prior art servo-type brake devices. In addition, the present invention has the additional advantage of being able to adjust the amount of force that is fed back from the stators to the pressure plate, by adjusting the length of the engaging pin on the pressure plate or cam lever. Moreover, the present invention eliminates the negative feedback effect that plagued prior art servo type braking devices that actually reduced the braking force that could be applied to a shaft when the shaft was rotating in a reverse direction.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

We claim:

1. A brake device for braking a rotatable shaft, comprising:
   a housing partially surrounding said shaft;

a plurality of annular rotors provided within said housing and mounted for rotation with said shaft;

a plurality of annular members provided within said housing for frictionally engaging said rotors, each of said annular members having a toothed portion at the outer circumferential portion thereof, each toothed portion having a plurality of teeth, at least one of said annular members being rotatable relative to said housing;

a pressure plated mounted for rotation within said housing relative to said annular members, said at least one rotatable annular member being rotatable relative to said pressure plate, rotation of said pressure plate in a first direction causes a frictional engagement between said rotors and said annular members thereby applying a braking force to said shaft, said pressure plate having an engaging portion at the outer circumferential portion thereof, said engaging portion being operatively contacted by the toothed portion of and thereby receiving a rotational force of said at least one rotatable annular member so that rotation of said at least one rotatable annular member in response to said frictional engagement rotates said pressure plate in said first direction; and a rotatable cam lever having an axis of rotation parallel to said shaft, said cam lever having a projection operatively engaging said pressure plate, whereby rotation of said cam lever rotates said pressure plate.

2. The brake device according to claim 1, further comprising means on said housing for preventing rotation of said at least one rotatable annular member in a second direction opposite to said first direction while said rotors rotate in said second direction.

3. The brake device according to claim 1, wherein said projection of said cam lever engages with a grove provided in the pressure plate.

4. The brake device according to claim 1, wherein said projection of said cam lever engages with said engaging portion of said pressure plate.

5. The brake device according to claim 4, wherein said projection of said cam lever is disposed between one of said toothed portions of said at least one rotatable annular member and said engaging portion of said pressure plate.

* * * * *